Nov. 21, 1950  B. HAMLIN  2,530,819
SADDLE TANK FOR MOTOR VEHICLES
Filed May 27, 1947  3 Sheets-Sheet 1

INVENTOR
BENSON HAMLIN
BY Oberlin & Limbach
ATTORNEYS

Nov. 21, 1950   B. HAMLIN   2,530,819
SADDLE TANK FOR MOTOR VEHICLES
Filed May 27, 1947   3 Sheets-Sheet 2

INVENTOR.
BENSON HAMLIN
BY
Oberlin & Limbach
ATTORNEYS.

Nov. 21, 1950　　　　　B. HAMLIN　　　　　2,530,819
SADDLE TANK FOR MOTOR VEHICLES
Filed May 27, 1947　　　　　　　　　　　　　3 Sheets-Sheet 3

INVENTOR.
BENSON HAMLIN
BY
Oberlin & Limbach
ATTORNEYS.

Patented Nov. 21, 1950

2,530,819

UNITED STATES PATENT OFFICE 2,530,819

SADDLE TANK FOR MOTOR VEHICLES

Benson Hamlin, Niagara Falls, N. Y., assignor to Jolene Corporation, Berea, Ohio, a corporation of Ohio Application May 27, 1947, Serial No. 750,779

9 Claims. (Cl. 280—5)

This invention relates to fuel tanks of the type generally referred to as "saddle tanks" and which are adapted to rest upon the longitudinal sills of highway tractors. In general saddle tanks comprise a central or saddle portion which rests directly upon the longitudinal sills of the vehicle and depending end portions which are connected thereto and depend therefrom at the outboard face of the sills, the end portions usually extending outwardly, laterally of the vehicle, about the same distance as the cab. Limitations of space make such tanks desirable but also necessitate the end tank portions being dangerously exposed to possible impact against and damage by passing vehicles and obstructions alongside the highway and the like. Also, in case of wrecks, the likelihood of the end tanks being torn loose or punctured, or of spilling their contents or of exploding, especially if the wreck is accompanied by fire, is pronounced.

These dangers being well known, the present practice is to construct such tanks of heavy steel plate, comparable to boiler plate so that they can withstand severe impacts without puncturing or breaking. Tanks so constructed are extremely rigid and unyielding, however, and as a result of their failure to yield appreciably, tend to concentrate the stresses from any impact along the structural joints with the result that they frequently break open or tear apart along the seams. The use of such plates also results in the tanks being disproportionately heavy relative to the weight of the fuel carried thereby. Again, there is a tendency for crystallization of the metal of such rigid structures along the lines of stress concentration due to the concentration of vibrations at such localized areas. This effect is aggravated by the extreme rigidity and non-yielding character of the heavy plate.

In accordance with the present invention, such tanks are not constructed of heavy plate material and thereby rendered extremely rigid and non-yielding. Instead, they are constructed of light weight, high tensile, sheet steel which renders them much lighter and more yieldable so as to absorb and distribute impact shocks, vibrations and the like, to resist puncturing as effectively as the heavy plate tanks heretofore used, and to distort or deform under concentrated localized impacts so as to reduce the instantaneous stresses which would be set up if the tank were non-yielding and extremely rigid. Likewise, with the present lighter tank, the inertia stresses resulting from the vehicle itself striking obstructions are greatly reduced.

The principal object of my invention is to provide a light, strong saddle tank capable of withstanding heavy impact stresses without puncturing or breaking open.

Another object is to provide a saddle tank of the character described which is composed of a very few separate pieces all of which can be made readily of light guage low alloy high tensile sheet steel on simple and generally available shop equipment, and connected together securely and economically.

Another object is to provide a saddle tank having a minimum length of seams and a minimum of reinforcing members.

Another object is to provide a tank having an effective fuel supply system for connection to the vehicle engine and an effective gas venting system with certain safety features embodied in both so that the danger from fires and explosions is reduced.

A more specific object is to provide a saddle tank having a top section into which the gas venting system can be fully installed before assembly of the tank and a bottom section in which the fuel supply system can be installed before assembly of the tank, the sections and installations being so related that the systems are complete and brought into final and proper operative relation when the top and bottom tank sections are assembled.

Other objects and advantages will become apparent from the following description in which reference is made to the drawings, in which.

Figure 2:
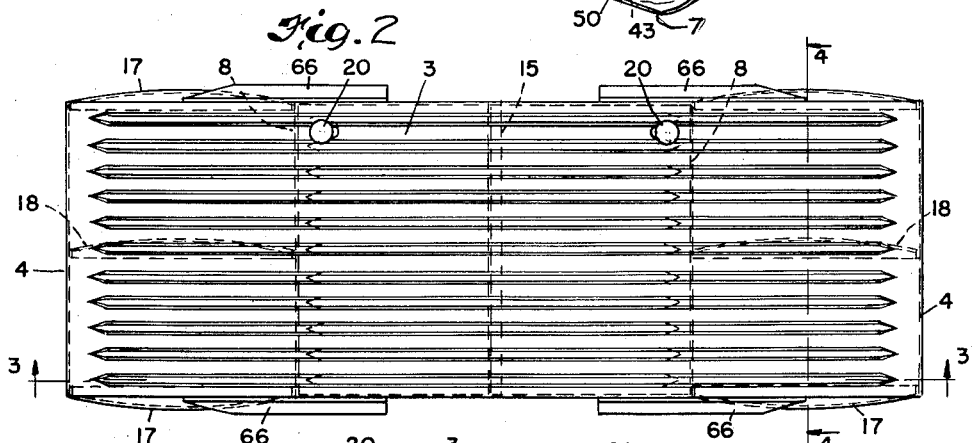
Fig. 2 is a top plan view of the tank illustrated in Fig. 1.
Figure 3:
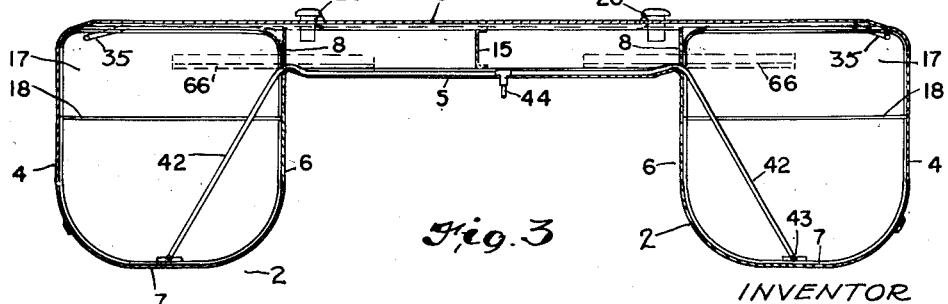
Figure 4:
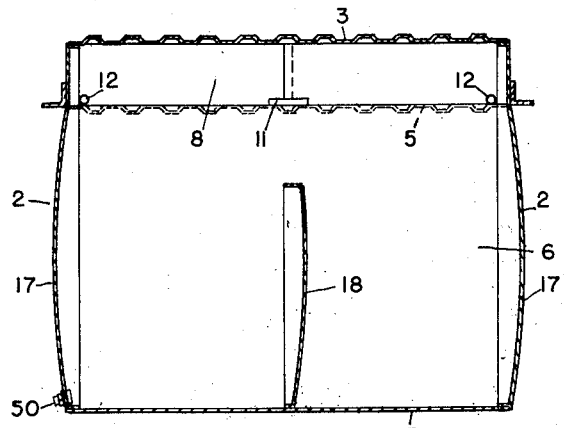
Figure 13:
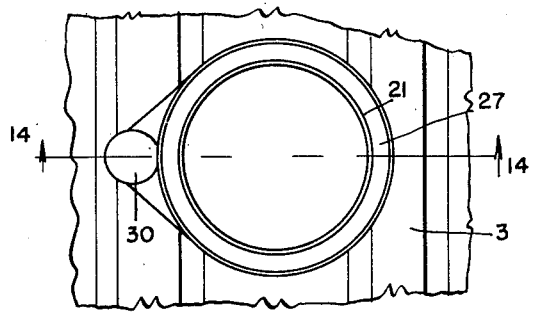
Figure 15:
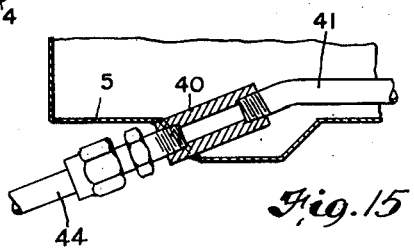
Figure 16:
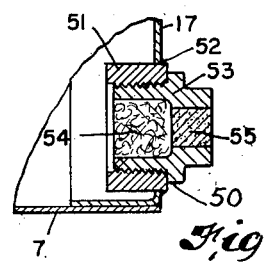
Figure 14:
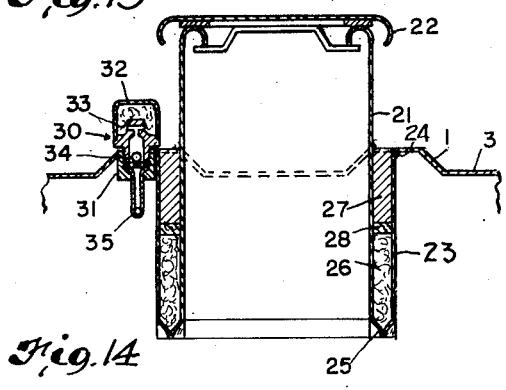

Figs. 3 and 4 are sectional views taken on lines 3—3 and 4—4 of Fig. 2;

Figs. 5 thru 8 are plan views of the flat layouts of the metal sheet from which the top, bottom, side-tank heads, and central channel of the tank are formed, respectively;

Figs. 9 thru 12 are perspective views of the top, bottom, side-tank heads and central channels formed respectively from the sheet metal layouts of Figs. 5 thru 8;

Fig. 13 is a top plan view of a filling neck and gas vent of the present tank;

Fig. 14 is a sectional view on line 14—14 of Fig. 13;

Fig. 15 is an enlarged fragmentary sectional view through the bottom wall of the saddle, showing the mounting of the external fuel supply fitting; and Fig. 16 is a longitudinal sectional view through one of the fusible drain plugs of the present invention.

Figure 1:
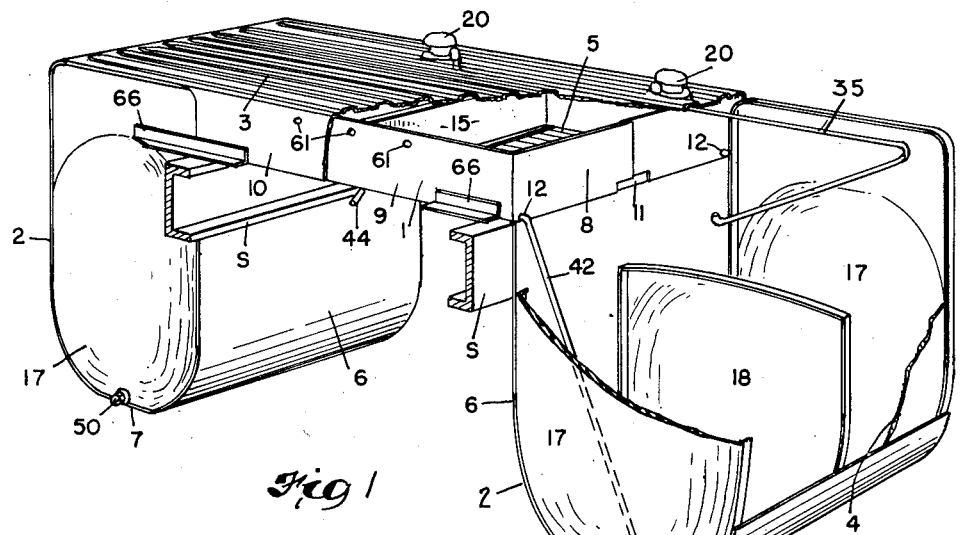
Fig. 1 is a perspective view of a saddle tank embodying the principles of the present invention, part thereof being shown in section for clearness in illustration.

Referring first to Fig. 1, the tank of the present invention comprises a saddle portion 1, which is adapted to rest upon and be supported by the longitudinal sills S of the highway tractor vehicle, and end tanks 2 carried by the saddle portion and depending therefrom at the outboard sides of the sills S.

The saddle tank is composed entirely of light guage, low alloy high tensile steel, such for example as Armco 50y of .050 inch thickness.

The saddle tank portion has a top wall 3 which covers the saddle portion, extends laterally of the vehicle to form the top of the end tanks 2 and continues downwardly to form the outboard walls 4 of the end tanks.

The saddle portion of the tank also has a bottom wall 5 which forms the bottom of the saddle portion and extends downwardly at its end to form the inboard walls 6 and bottom walls 7 of the end tanks.

The saddle portion of the tank is provided with bulk-head walls 8 which extend from the top wall 3 to the bottom wall 5. The front and rear of the saddle portion are closed by inner walls 9 and outer walls 10. As will more fully appear hereinafter, the walls 8 are integral with the inner walls 9 and the inner walls 9 are integral with the bottom wall 5. The walls 8 are seam welded to the bottom wall along their lower edges and are provided with central openings 11, respectively, and apertures 12 so as to permit fuel to flow readily from the saddle portions to the end tanks in all tilted positions of the tank. They are of such size as to prevent the admission of a siphon tube from the filling neck, later to be described, into the end tanks 2.

The top wall 3 is corrugated, the ridges of the corrugations extending to the outboard walls 4 of the end tanks and being struck upwardly, instead of downwardly, from the normal plane of the wall 3 so as to afford drainage of the troughs between the corrugations. The upper edges of the end walls 8 are tack welded to the undersurface of the troughs of the corrugations in the top wall 3.

The inner walls 9 are integral with the bottom 5 along their lower edge and integral with the walls 8 at their ends. The outer walls 10 are integral at their upper edges with the top wall 3.

Extending in a fore and aft direction between the inner front and rear walls 9 is a central channel 15 which is positioned at the center line of the saddle portion and is welded at its bottom edge to the top of the corrugations of the bottom wall 5 and at its ends to the inner walls 9.

Each end tank 2 has front and rear headers 17 forming the front and rear walls thereof, all of the headers being identical with each other. Likewise each tank is provided with an antisplash baffle 18 which may be identical with the headers 17.

Fuel is supplied to the saddle tank by filling necks 20 which are located in the saddle portion and extend upwardly through the top wall 3 thereof near the forward corners of the saddle portion. Thus, the entire tank can be filled by either neck 20, communication between the tanks being provided beneath the channel 15 by the valleys of the corrugations of the bottom wall 5.

The necks 20 are identical and one only is described in detail. Referring to Fig. 14, each neck 20 comprises a length of tube 21 of the conventional automobile gas tank neck having an inturned notched flange at the top by means of which a detachable cap 22 is secured thereto. The cap itself is the conventional closure cap but the gas vent aperture is closed permanently with solder.

A mounting tube 23 of larger diameter than the tube 21 is secured in a suitable hole in the wall 3 by welding, as indicated at 24, and extends into the saddle portion of the tank. The tube 21 is mounted in coaxial relation in the tube 23, the lower margins of the tubes being crimped together at spaced points about their peripheries, as indicated at 25, so as to form an annular passage for gas between the tubes. The lower portion of the passage is filled with copper wool 26 or other suitable material to provide a flame trap and the upper portion of the annular passage is filled with a low melting point alloy 27 preferably by melting and pouring the alloy thereinto, a suitable felt washer 28 being interposed between the flame trap and alloy.

The alloy is preferably one which will not melt when immersed in the fuel so as to be kept relatively cool thereby but will melt readily when not so immersed if subjected to fire. Thus, in event of fire, when there is an air or gas space above the level of the fuel, the alloy can melt and be blown out of the passage between the tubes by the pressure of gases in the tank. Since the passage between the tubes is restricted in size, the gaseous media vented therefrom are discharged at high velocity and consequently burn with a flame which begins a few inches from the top of the tubes. This greatly reduces the possibility of a flash back into the tank. So long as the fuel in the tank covers the tube 23, the alloy will not melt and accordingly liquid fuel cannot run out between the tubes 21 and 23.

As mentioned, the necks 20 are arranged in the saddle portion of the tank so as to be in as protected a position as possible.

In order to vent the tank and yet provide that the danger in case of wrecks and fire is reduced to a minimum, the gas venting system illustrated is provided, the outlets of the venting system being shown in detail in Fig. 14.

Two identical outlet vents are provided and they are arranged as closely as possible to the filling necks 20, respectively, so as to be protected thereby from damage by external agents.

Each vent 30 comprises a fitting 31 welded in place in the top wall 3 and a complementary fitting 32 secured thereto and provided with a restricted bore 33 which extends from the outside of the fitting 32 into a central bore thereof. The fitting 32 is filled with copper wool or other suitable substance to act as a flame check. A ball 34 is arranged to seat in the central bore of the fitting 32, in advance of the bore 33, in event the tank is inverted, so as to prevent the escape of liquid fuel through the vents.

Each fitting 31 has secured thereto a vent tube 35, which, as illustrated in Fig. 1, extends from the fitting to the farther removed end of the saddle portion and thereyond substantially to the outboard wall of the end tank of the said farther removed end of the saddle portion. Adjacent the outboard wall, the tube is bent parallel thereto and extends to the rear outboard corner of the end tank. The tubes are secured against the top wall 3 for ease in assembly, as will later be discussed.

The feed system comprises a fitting 40 secured to the saddle portion in the bottom wall 5 which is corrugated, the fitting preferably being inset from the rearwardly disposed wall of saddle portion in the side wall of one of the corrugations. Leading from the fitting is a pipe line 41 having a T-connection by which it is connected to the pipe lines 42. The lines 42 lead to the tanks 2, respectively, and have their inlet ends 43 closely adjacent the bottom thereof near the rear header 17. A single feed line 44 leads from the fitting 40 forwardly for connection to the engine of the vehicle.

This arrangement of the fuel system has several advantages among which the more important are its adaptability to ease in assembly, as hereinafter more fully described, and the siphonic action as a result of which the engine draws fuel from the tank having the highest instantaneous level so that the volume of fuel remaining in each end tank is always approximately equal to that remaining in the other.

As additional safety features, fusible drain plugs 50 are provided in the rear headers 17 of the end tanks. As illustrated in Fig. 16, each plug comprises an internally threaded sleeve 51 welded, as indicated at 52, into place in an opening in a rear header 17. Threaded into the sleeve is a plug 53 having a central bore, of which the inner end is filled with copper wool 54 to provide a flame trap. The outer end of the bore is filled with fusible alloy such as heretofore discussed. Accordingly in case of fire, if the sleeve 51 is immersed in fuel, the plug remains sealed but if it is exposed to the heat while the sleeve is above the liquid fuel, the alloy 55 melts out and permits gaseous media to escape and burn as a flame which begins a few inches out from the plug 53.

Thus four fusible alloy vents are provided in the tank at widely spaced points so that it can reasonably be assumed that at least one would be exposed while not immersed, and in case of fire, melt and vent the gases so that the tank could not explode whereas the others would remain sealed and prevent the escape of liquid fuel.

Referring next to the various members of which the tank is constructed and the manner in which they are assembled and joined, the blanked out members are illustrated in Figs. 5 through 8 and the shapes into which the blanks are formed are illustrated in Figs. 9 through 12.

Figure 5:
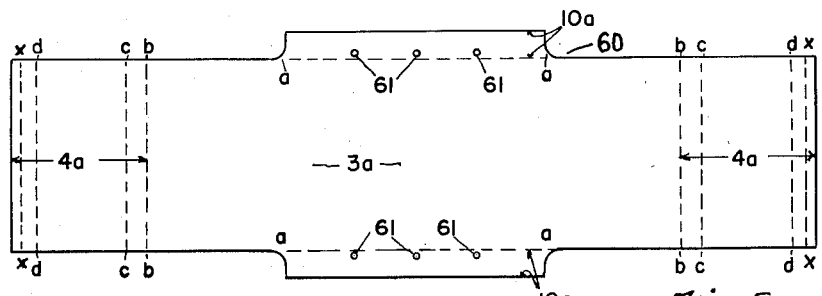

The top wall 3, outboard end tank walls 4, outer walls 10, are formed of a single flat sheet of material 60 which is cut to the shape illustrated in Fig. 5, the portions thereof corresponding to the walls 3, 4, and 10 being designated 3a, 4a, and 10a respectively. The lines of bend between the portions 3a and 10a are indicated by dotted lines $a$—$a$. The portions to form the rounded upper outboard edges of the end tanks are bounded between lines $b$—$b$ and $c$—$c$. The portions to form the rounded lower outboard edges of the end tanks extend from the line $d$—$d$ to the ends of the sheet 60. The overlap at the walls 4 extends from the end of the sheet to the line $x$—$x$. The portions 10a are contoured at their ends in the flat so that they will conform to the contour of the headers 17 in final assembly.

A row of apertures 61 is punched in the flat sheet for purposes of assemblage as will be described hereinafter.

Figure 9:
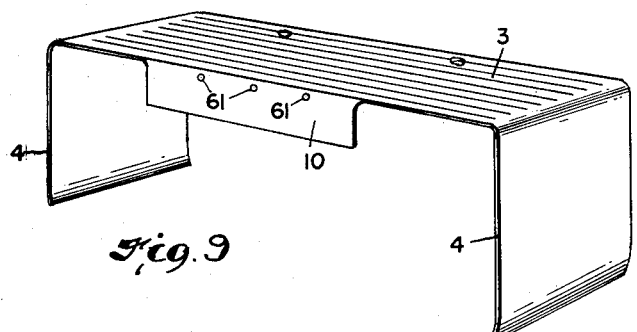
Figure 11:
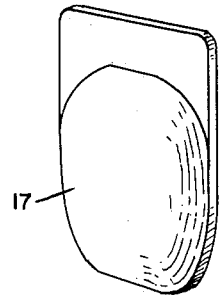

The sheet 60 is corrugated and then formed by bending in the usual sheet metal equipment into the shape illustrated in Fig. 9 in which the various portions are indicated by the same numerals as are used therefor in Figs. 1 through 4.

Figure 6:
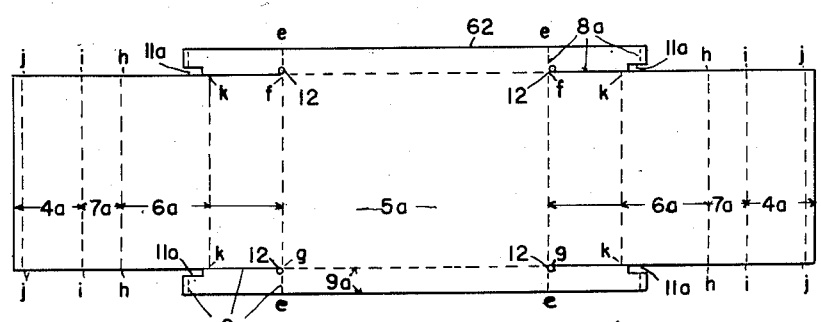

In Fig. 6 there is illustrated sheet 62 which forms the bottom wall 5, inboard end tank walls 6, end tank bottom walls 7, bulkhead walls 8, and inner end walls 9.

The wall portions of the tank formed from the sheet 62 are indicated by the same numerals as are used for the tank walls, accompanied by suffixes $a$, respectively.

The bottom wall 5 is formed from the portion 5a which is bounded at the ends by the lines $e$—$e$, at the front by line $f$—$f$ and at the rear by line $g$—$g$.

The walls 6 are bounded by the lines $e$—$e$ and $h$—$h$, the wall 7 by the lines $h$—$h$ and $i$—$i$, and a portion of the wall 4 by the line $i$—$i$ and the end of the sheet, the overlap for welding to the portion of the wall 4 extending from the line $j$—$j$ to the end of the sheet. In order to form the lower rounded inboard and outboard edges of the end tank 2, the sheet is bent on a gradual curve from line $h$—$h$ to line $k$—$k$ and from line $i$—$i$ to line $j$—$j$.

The walls 8 are formed from the portions 8a which are integral with the portion 9a along the lines $e$—$e$. The end portions of the portions 8a outwardly beyond the lines $e$—$e$ to their ends are severed from the main body of the sheet, and a notch 11a is cut therein in position to form part of the opening 11. The drain apertures 12 are punched in the portions 8a closely adjacent the lines $e$—$e$. The portions 8a are of sufficient length to permit lap welding when they are brought together to form the walls 8. The sheet 62 is bent by the usual equipment into the shape illustrated in Fig. 10.

If desired the sheets 60 and 62 may be formed in heavy presses, each in a single operation, but can be formed as readily on the small cutting, folding and bending equipment usually available in smaller sheet metal shops.

Figure 7:
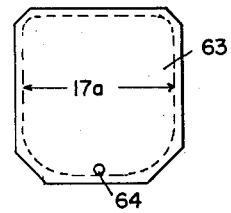

The end-tank heads, or headers, 17 preferably are cut to shape illustrated in Fig. 7, only linear cuts being required. As there illustrated, a sheet 63 is trimmed and then placed in a press and shaped to provide a central portion 17a, bounded by the dotted line, which is dished or bulged out of its normal plane to provide an outwardly bulged and rounded outer wall surface for greater strength and for appearance. The margin is turned to provide a peripheral flange extending entirely around the portion 17a. An opening 64 is punched in the sheet and forms the opening for the plug 50 when the header is used for an outside head wall of the tank. The opening 64 also provides a drain past the baffle 18 when the header 17a is used as a baffle.

Figure 8:
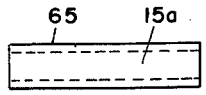

The central channel is illustrated in Fig. 8 and is formed of a rectangular length of the sheet stock 65, the margins of which are turned to form the flanges.

With the members thus described, assembly is a simple matter.

After the top section of the tank, illustrated in Fig. 9 is corrugated and shaped and the filler necks 20 are installed so as to extend about 1½ inches above the upper surface of the wall 3, the vent systems, complete with the vents 30 and pipe lines 35 are installed therein.

Figure 10:
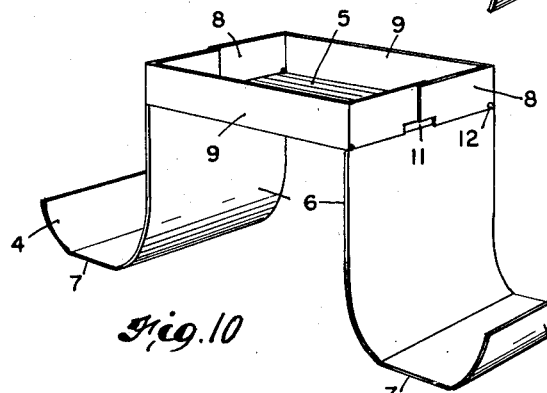
Figure 12:
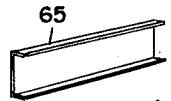

The bottom section, illustrated in Fig. 10, is corrugated and shaped and the portions 8a of the bottom section are folded and brought together and welded along their lower edges to the bottom wall portion 5a. Their adjacent ends are lap welded together.

Next the central channel 15 is installed in the bottom section and welded along its bottom to the wall 5 and at its ends to the inner end walls 9. Next the fuel supply system, complete with the fitting 40 and pipe lines 41 and 42, is installed therein.

Next the top section is placed on the lower and rosette welds are made through the holes 61 of the outer end walls 10 to the inner end walls 9. The outer walls 10 are welded to the inner walls 9 at the ends of the latter where they integrally join the walls 8. Next the bottom margins of the walls 9 and 10 are welded together, and the walls 8 are tack welded at their upper edges to the underface of the corrugation troughs of the top wall 5.

The baffles 18 are then inserted as also are jig rings or forms of the contour of the headers 17 and the walls 4, 7 and 6 are drawn tightly to contour thereabout by straps or jigs. While held in this condition, the baffles 18 are welded in place. The sleeves 51 and fusible plugs 53 are installed in the headers 17.

The jig rings or forms are then removed, the straps released, and the headers 17 are installed by drawing the sheet stock tightly thereabout and welding all around all four headers 17. The portions of the wall 4 are then lap welded together. This latter step may be performed before installing the headers 17, if so desired, while the jig rings are in place.

Upon completion of the latter of the two steps last described, the tank is complete and ready for mounting, except for the mounting angles. These may be installed by the manufacturer of the tank, or by the user, preferably by welding.

In the form illustrated, the angles 66 are cut from ordinary structural angle stock, trimmed to shape, as illustrated in Figs. 2 and 3 and welded in place. The angles 66 are positioned with their horizontal flanges flush with the bottom plane of the bottom wall 5 and extend from a point inboard of the bulkheads 8 to about the midportion of the end tanks, thus stiffening the tank so as to reduce compressive stresses in the relatively thin bottom wall 5 and inboard walls 6.

Generally, the top wall is coated with an antislip paint or composition and a suitable liquid anti-corrosion is poured into the finished tank, sloshed about a few minutes, and then drained out.

The tank is then ready for use, the prelocated fuel and vent systems having been installed before assembly of the tank when ease of access and inspection were afforded.

The resultant tank is extremely strong yet yieldable without tearing under severe strains, and is very light in proportion to the weight of the fuel carried thereby. It is not as easily damaged by impacts, vibration and crystallization of the metal, and the stresses are more evenly distributed than in the heavy tanks formed of plate.

The tank may be attached to the chassis of the tractor by shear bolts engaging the tractor frame and the supporting angles 65.

Among the additional advantages of the foregoing structure are the following:

All of the tank is of low alloy high tensile light sheet steel which can be stocked in a single width; the top wall is corrugated for drainage and strength and is additionally reinforced by the bulkheads, central angle, and curved edges; the tank is constructed of nine pieces, only four of which are different from each other; aside from the gas necks, vents and fusible plugs; the tank is all welded and can deform and twist without puncturing and tearing; all parts can be cut in flat patterns and shaped in light readily available and inexpensive equipment, the parts are readily accessible during construction for welding from either or both sides, except in the final stages in which external welding can be used without interference by previously assembled structure; the total amount of welding required is reduced to a minimum; the headers are concavo-convex and require no auxiliary bracing, the bulkheads with their openings prevent siphoning of fuel from the end tanks; the gas venting system and fuel necks can be fully installed in final condition in the top section before final assembly of the tank; the fuel supply system can be fully installed in final condition in the bottom section of the tank before final assembly of the tank; the filling necks and gas vent fittings are well protected as also are the exterior fuel system fittings and fusible safety means are provided at widely distributed locations.

Having thus described my invention, I claim:

1. A saddle tank having a saddle portion and end tanks and comprising a top section and a bottom section, the top section comprising a single piece of sheet metal part of which is in the form of a top wall which extends entirely across the saddle portion and end tanks and has its outer end portions extending downwardly from its normal plane and providing a part of integral outboard walls of the end tanks, the sheet having its front and rear margins extending downwardly generally normal to the plane of the top wall and providing integral exterior end walls of the saddle portion, the bottom section comprising a single piece of sheet metal part of which is in the form of a bottom wall of the saddle portion which extends to the inboard planes of the end tanks and has downwardly extending portions generally normal to the plane of the bottom wall and providing integral inboard walls of the end tanks, and portions therebeyond toward the ends of the sheet providing the bottom walls and part of the outboard walls of the end tanks, the front and rear margins of the sheet extending upwardly from the bottom wall and forming integral internal end walls of the saddle portion, and being severed from the sheet along their line of intersection with the bottom wall partway inwardly from their ends, said severed portions extending fore and aft of the saddle portion and providing bulkheads of the saddle portion between the saddle portion and end tanks, the end portions of the sheets being secured together at the outboard walls, and headers closing the front and rear of each of the end tanks.

2. A saddle tank comprising a saddle portion and end tanks, said saddle portion comprising a top section of a single sheet of metal which is in the form of a top wall with depending front and rear walls integral therewith and a bottom section comprising a single sheet of metal, part of which is in the form of a bottom wall with front and rear walls integral therewith and juxtaposed with the front and rear walls of the top section and secured thereto, and having bulkheads integral at their ends with the front and rear walls of the bottom section and forming the end walls of the saddle portion, each bulkhead being secured to the top and bottom walls, said end tanks extending outwardly from the saddle portion beyond the bulkheads, each end tank having a top wall, an outboard wall, a bottom wall and an inboard wall, part of the said end tank walls being integral with the top walls and the remainder of said end tank walls being integral with the bottom wall.

3. A saddle tank having a saddle portion and end tanks, and comprising a top section of a single sheet of metal and a bottom section of a single sheet of metal, the top section including the top wall of the saddle portion and top walls of the end tanks which are integral therewith, the bottom section including the bottom wall of the saddle portion, inboard walls of the end tanks which are integral therewith and the bottom walls of the end tanks which are integral with the inboard walls, at least one of said sections having front and rear walls of the saddle portion integral therewith, and headers closing both ends of the tanks.

4. A tank according to claim 3 characterized in that said headers are duplicates of each other, and there are upright internal baffle walls in the end tanks, respectively, each of said baffle walls being a substantial duplicate of one of the headers for at least a major portion of the height of said one of the headers from the lower edge of said one of the headers, and said baffle walls being mounted in the tanks between the front and rear thereof.

5. A saddle tank having a saddle portion and a pair of end tanks carried thereby at opposite ends of the saddle portion and comprising a one-piece top section of low alloy, high tensile sheet steel forming continuous integral top walls of said saddle portion and said end tanks and outboard wall portions of the end tanks integral with the top walls thereof, and outer front and rear walls of the saddle portion integral with its top wall and further comprising a one-piece bottom section of low alloy, high tensile sheet steel forming the bottom wall of the saddle portion and inboard walls of the end tanks integral with the bottom wall, bottom walls of the end tanks integral with said inboard walls, and outboard wall portions integral with the end tank bottom walls, inner front and rear walls of the saddle portion integral with the bottom wall thereof and bulkheads integral at their ends with the inner front and rear walls and forming portions between the saddle portion and end tanks respectively, said outboard wall portions being in lapped relation and integrally bonded together, said outer front and rear walls being integrally bonded to the inner front and rear walls respectively, said bulkheads being integrally bonded to the bottom wall, and headers closing the front and rear of the end tanks and integrally bonded to the walls thereof.

6. A saddle tank having a saddle portion and end tanks and comprising a top section and a bottom section, the top section comprising a single piece of sheet metal, part of which is in the form of a top wall which extends entirely across the saddle portion and end tanks and has its outer portions extending downwardly from its normal plane and providing part of integral outboard walls of the end tanks, said sheet having front and rear margins, at least one of which extends downwardly generally normal to the plane of the top wall and provides an integral wall of the saddle portion, the bottom section comprising a single piece of sheet metal, part of which forms the bottom wall of the saddle portion and which extends to the inboard planes of the end tanks and has downwardly extending portions generally normal to the plane of the bottom wall and providing integral inboard walls of the end tanks, and portions therebeyond toward the ends of the sheet providing the bottom walls and part of the outboard walls of the end tanks, said last mentioned sheet having front and rear margins at least one of which extends upwardly from the bottom wall and forms an integral end wall of the saddle portion, the end portions of the sheets being secured together at the outboard walls, respectively, and headers closing the front and rear of each of the end tanks.

7. A saddle tank having a saddle portion and end tanks and comprising a top section and a bottom section, the top section comprising a single piece of sheet metal, part of which is in the form of a top wall which extends entirely across the saddle portion and end tanks and has its outer portions extending downwardly from its normal plane and providing part of integral outboard walls of the end tanks, the bottom section comprising a single piece of sheet metal, part of which is in the form of a bottom wall of the saddle portion which extends to the inboard planes of the end tanks and has downwardly extending portions generally normal to the plane of the bottom wall and providing integral inboard walls of the end tanks, and portions therebeyond toward the ends of the sheet providing the bottom walls and part of the outboard walls of the end tanks, the front and rear margins of the sheet of the bottom section extending upwardly from the bottom wall and being severed from the sheet along their lines of intersection of the bottom wall partway inwardly from their ends, said severed portions extending fore and aft of the saddle portion and providing bulk-heads of the saddle portions between the saddle portion and end tanks, front and rear walls closing the front and rear of the saddle portion and headers closing the front and rear of each of the end tanks.

8. A saddle tank having a saddle portion and end tanks and comprising a top section and a bottom section, the top section comprising a single piece of sheet metal, part of which is in the form of a top wall which extends entirely across the saddle portion and end tanks and has its outer portions extending downwardly from its normal plane and providing part of integral outboard walls of the end tanks, the bottom section comprising a single piece of sheet metal, part of which is in the form of a bottom wall of the saddle portion which extends to the inboard planes of the end tanks and has downwardly extending portions generally normal to the plane of the bottom wall and providing integral inboard walls of the end tanks, and portions therebeyond toward the ends of the sheet providing the bottom walls and part of the outboard walls of the end tanks, the end portions of the sheets being secured together at the outboard walls, front and rear walls closing the front and rear of the saddle portion, respectively, and headers closing the front and rear of each of the end tanks.

9. A saddle tank having a saddle portion with end tanks on opposite ends thereof and depending therefrom and in communication therewith, said saddle portion comprising a bottom wall with upwardly front and rear margins and a top wall with down-turned front and rear margins, said upturned front and rear margins having free end portions extending forwardly and rearwardly of the saddle portion and forming end walls of the saddle portion and said front and rear down-turned margins being juxtaposed with the front and rear upturned margins, respectively, and bonded thereto in said juxtaposed relationship.

BENSON HAMLIN.

REFERENCES CITED

The following references are of record in the file of this patent:

UNITED STATES PATENTS

| Number | Name | Date |
|---|---|---|
| 1,982,879 | Overbury | Dec. 4, 1934 |
| 2,138,104 | Kellogg | Nov. 29, 1938 |
| 2,181,772 | Snyder | Nov. 28, 1939 |
| 2,276,963 | Griffin | Mar. 17, 1942 |
| 2,314,298 | Welch | Mar. 16, 1943 |
| 2,389,168 | Snyder | Nov. 20, 1945 |
| 2,445,275 | Lintern et al. | July 13, 1948 |
| 2,465,173 | Scales et al. | Mar. 22, 1949 |